United States Patent [19]

Kondo et al.

[11] Patent Number: 5,392,804
[45] Date of Patent: Feb. 28, 1995

[54] FUEL TANK STRUCTURE

[75] Inventors: Seiji Kondo, Chiryu; Yoshihiro Kato, Seto, both of Japan

[73] Assignee: Aisan Kogyo Kabushiki Kaisha, Ohbu, Japan

[21] Appl. No.: 153,952

[22] Filed: Nov. 18, 1993

[30] Foreign Application Priority Data

Nov. 24, 1992 [JP]  Japan .................................. 4-313148

[51] Int. Cl.⁶ ..................... F16K 24/04; F16K 17/36; F02M 33/02
[52] U.S. Cl. ..................... 137/202; 137/43; 137/574; 137/587; 123/519
[58] Field of Search ................ 137/43, 202, 574, 587; 123/518, 519

[56] References Cited

U.S. PATENT DOCUMENTS

| | | | |
|---|---|---|---|
| 3,800,978 | 4/1974 | Sigwald | 137/587 X |
| 3,910,302 | 10/1975 | Sudhir | 137/202 X |
| 4,430,099 | 2/1984 | Vanagisawa et al. | 123/519 X |
| 4,781,218 | 11/1988 | Mori et al. | 137/202 |
| 5,028,244 | 7/1991 | Szlaga | 137/202 X |
| 5,054,528 | 10/1991 | Saitoh | 137/587 X |
| 5,065,782 | 11/1991 | Szlaga | 137/202 X |
| 5,172,714 | 12/1992 | Kobayashi et al. | 137/43 X |
| 5,277,168 | 1/1994 | Kondo et al. | 123/519 |

FOREIGN PATENT DOCUMENTS 62-91721 6/1987 Japan .
62-194932 8/1987 Japan .
63-6940 1/1988 Japan .
63-7030 1/1988 Japan .

*Primary Examiner*—John Rivell
*Attorney, Agent, or Firm*—Cushman, Darby & Cushman

[57] ABSTRACT

A fuel tank structure in an automobile comprising: a fuel tank having a recessed portion and first and second air chambers separated by the recessed portion and having top walls located at different levels; a fuel tube with a breather pipe; a fuel cutoff valve provided on the high-level top wall of the first air chamber and having a casing projecting thereinto, discharge holes for fuel evaporation gas, a valve seat opening formed at the central portion on a top wall of the casing, a float valve movably provided in the casing, and a spring for pressing the float valve toward the valve seat opening; a fuel cutoff valve with a float provided on the low-level top wall of the second air chamber and having a casing projecting thereinto, discharge holes for fuel evaporation gas, a second float valve movably provided in the casing to tightly close a valve seat opening, a spring for pressing the second float valve toward the valve seat opening, a lower casing provided at a bottom of the casing, a float movably accommodated in the lower casing and having a push rod for lifting the second float valve; and a conduit device extending from the fuel cutoff valve and the fuel cutoff valve with the float through a check valve to a canister.

4 Claims, 7 Drawing Sheets

FUEL TANK STRUCTURE

BACKGROUND OF THE INVENTION

1. Industrial Field of the Invention

The present invention relates to a fuel tank structure using a fuel cutoff valve with a float.

2. Description of Related Art

A conventional fuel tank to be installed in an automobile includes a recessed portion 1a formed at the central portion on a top wall of the tank 1, the shape of the recessed portion being adapted corresponding to a certain component surrounding the fuel tank, and two air chambers, i.e., a first air chamber 2 and a second air chamber 3 separate from each other, as shown in FIG. 6. The air chambers are formed on both sides of the recessed portion 1a. The both air chambers 2 and 3 have top walls positioned at levels in height different from each other.

Fuel cutoff valves 4 and 5 are projectingly provided on the top walls of both the air chambers 2 and 3. The fuel cutoff valves 4 and 5 operate to discharge fuel evaporation gas in the air chambers 2 and 3 and to interrupt fuel from flowing out of the fuel tank when a level of the fuel is raised to exceed a predetermined height.

Typically, such a fuel cutoff valve has a structure as illustrated in FIG. 7. More specifically, discharge holes 7 for the fuel evaporation gas are formed at an upper end of a casing 6 so that the fuel evaporation gas generated in the air chamber is exhausted from the discharge holes 7 through a valve seat opening 8, a passage 9 and a check valve 40 to a canister (not shown).

When the fuel level is raised up to the casing 6 and a float valve 10 is sunk in the fuel, the float valve 10 rises due to its buoyancy so that its valve portion 10a closes the valve seat 8 to thereby prevent the fuel from flowing out through the passage 9 to the canister.

When the fuel is supplied into the fuel tank 1, the level of the fuel is stopped at a position of an inner edge of a breather pipe 12 by means of the check valve 40 under a condition in which the tank is fully filled with the fuel supplied through the fuel tube 11 shown in FIG. 6. For the reasons, in the fuel tank having the above-mentioned air chambers 2, 3 with the top walls having the different heights from each other, under the condition in which the fuel tank is fully filled with the fuel as shown in FIG. 6, a distance H from the fuel level to the top wall in the first air chamber 2 having the high-level top wall is relatively long. A distance L from the fuel level to the top wall in the second air chamber 3 having the low-level top wall is relatively short.

Consequently, in the conventional fuel tank including the fuel cutoff valves 4 and 5 having heights equal to each other, in some cases, the fuel level comes close to the fuel cutoff valve 5, or the fuel cutoff valve 5 is sunk in the fuel in the second air chamber 3 under the condition in which the tank is fully filled with the fuel.

Under such a condition, when the automobile is turned or braked, the fuel in the fuel tank quakes so that waves of the fuel are splashed on the fuel cutoff valve 5. Part of the fuel waves sometimes enters an upper chamber of the float valve 10 from the discharge holes 7 for the fuel evaporation gas formed at the upper end of the casing 6. Because pressure in the air chamber 3 is higher than an atmospheric pressure on the side of the canister, the fuel spouts from the valve seat opening 8 due to the pressure difference between the air chamber 3 and the canister so as to flow through the passage 9 into the canister, Thus, the prior art possesses a problem in that deterioration of the canister is accelerated in the case where the fuel flows into the canister.

SUMMARY OF THE INVENTION

In view of the above, the present invention is aimed to provide a structure of a fuel tank including a fuel cutoff valve with a float which can solve the problem of the prior art. In the fuel tank which has air chambers with top walls formed at levels in height different from each other, as mentioned above, a distance between the fuel level and a discharge hole portion for fuel evaporation gas in the fuel cutoff valve with a float disposed in the air chamber having the low-level top wall can be maintained to be long even under a condition in which the tank is fully filled with the fuel, thereby preventing the fuel from flowing through the discharge hole into an upper chamber of the valve.

To attain the above object, according to the present invention, a structure of a fuel tank to be installed in an automobile comprises a fuel tank formed with a recessed portion at the central portion on a top wall thereof, and a first air chamber and a second air chamber separated from each other by the recessed portion, the first and second air chambers having top walls located at levels in height different from each other; a fuel tube attached to the fuel tank and equipped with a breather pipe; a fuel cutoff valve provided on the high-level top wall of the first air chamber; a fuel cutoff valve having a float which is provided on the low-level top wall of the second air chamber; and pipe means extending from the fuel cutoff valve and the fuel cutoff valve having the float so as to extend through a check valve to a canister.

The fuel cutoff valve has a casing projecting in the interior of the first air chamber, discharge holes for fuel evaporation gas formed at an upper end of the casing so as to communicate the first air chamber with the interior of the casing, a valve seat opening formed at the central portion on a top wall of the casing, a first float valve vertically movably provided in the casing in order to tightly close the valve seat opening when the float valve moves upwardly, and a spring for pressing the first float valve toward the valve seat opening.

The fuel cutoff valve with a float has a casing projecting in the interior of the second air chamber, discharge holes for fuel evaporation gas formed at an upper end of the casing so as to communicate the second air chamber with the interior of the casing, a valve seat opening formed at the central portion on a top wall of the casing, a second float valve vertically movably provided in the casing in order to tightly close the valve seat opening when the float valve moves upwardly, a spring for pressing the second float valve toward the valve seat opening, a lower casing provided at a bottom of the casing and extending therefrom downwardly, a float vertically movably accommodated in the lower casing, and a push rod for lifting the second float valve, the push rod being provided on a top wall of the float.

In the structure of the fuel tank according to the invention, a first conduit extending from the fuel cutoff valve and a second conduit extending from the fuel cutoff valve with the float are connected to each other into a common conduit on the upstream side of the check valve. The check valve and the canister may commonly be used.

Also, the first conduit for the fuel cutoff valve and the second conduit for the fuel cutoff valve with the float include check valves, respectively, and they may be connected to each other on the downstream sides of the check valves so as to lead to the canister.

Further, the first and second conduits for the fuel cutoff valve and the fuel cutoff valve with the float may include check valves and canisters, respectively.

With such arrangement, when the level of the fuel in the fuel tank rises up to the float of the fuel cutoff valve with the float provided in the second air chamber, the float is raised by its own buoyancy so that the push rod forces the second float valve upwardly to close the valve seat opening.

By this closure, the second air chamber is tightly sealed and at that time, the rise of the fuel level is stopped.

A distance between the uppermost fuel level and the position of the discharge hole is extremely large, as compared with the conventional fuel cutoff valve in which the float valve itself rises so as to close the valve seat opening when the level of the fuel arrives at the float valve.

Accordingly, as shown in FIG. 1, if the fuel cutoff valve with the float is provided in the second air chamber with the top wall located at a position lower than that of the first air chamber, at the time of fuel supply, the distance between the fuel level in the second air chamber and the discharge hole of the fuel cutoff valve with the float can be predetermined to be large, when the rise of the fuel level is stopped.

As a result, even if the fuel level becomes slant or the surface of the fuel quakes when the automobile is inclined or braked under the condition such that the fuel tank is fully filled with the fuel, the fuel is less liable to splash on the discharge holes in the air chamber having the low-level top wall.

Therefore, the fuel is prevented from flowing through the discharge holes into an upper chamber of the second float valve and spouting out of the valve seat opening.

When the automobile turns over and lies on its side, the second float valve closes the valve seat opening due to its own weight and a pressing force of the spring, thereby inhibiting the fuel from flowing out of the tank.

DETAILED DESCRIPTION OF THE PREFERRED EMBODIMENT

A description will now be given to a fuel tank structure according to the present invention and a first embodiment of a fuel cutoff valve with a float therein illustrated in FIGS. 1 and 2.

Figure 1:
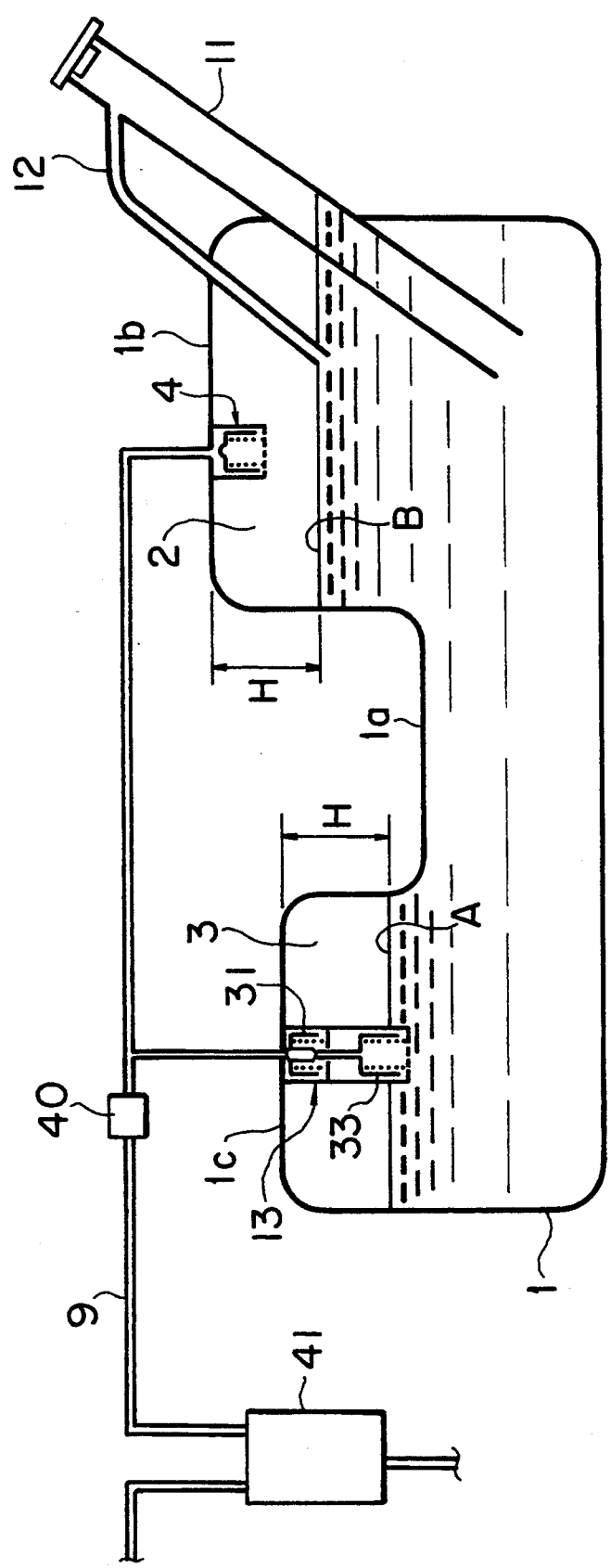
FIG. 1 is a cross-sectional view of a fuel tank provided with a fuel cutoff valve having a float according to the present invention.
Figure 2:
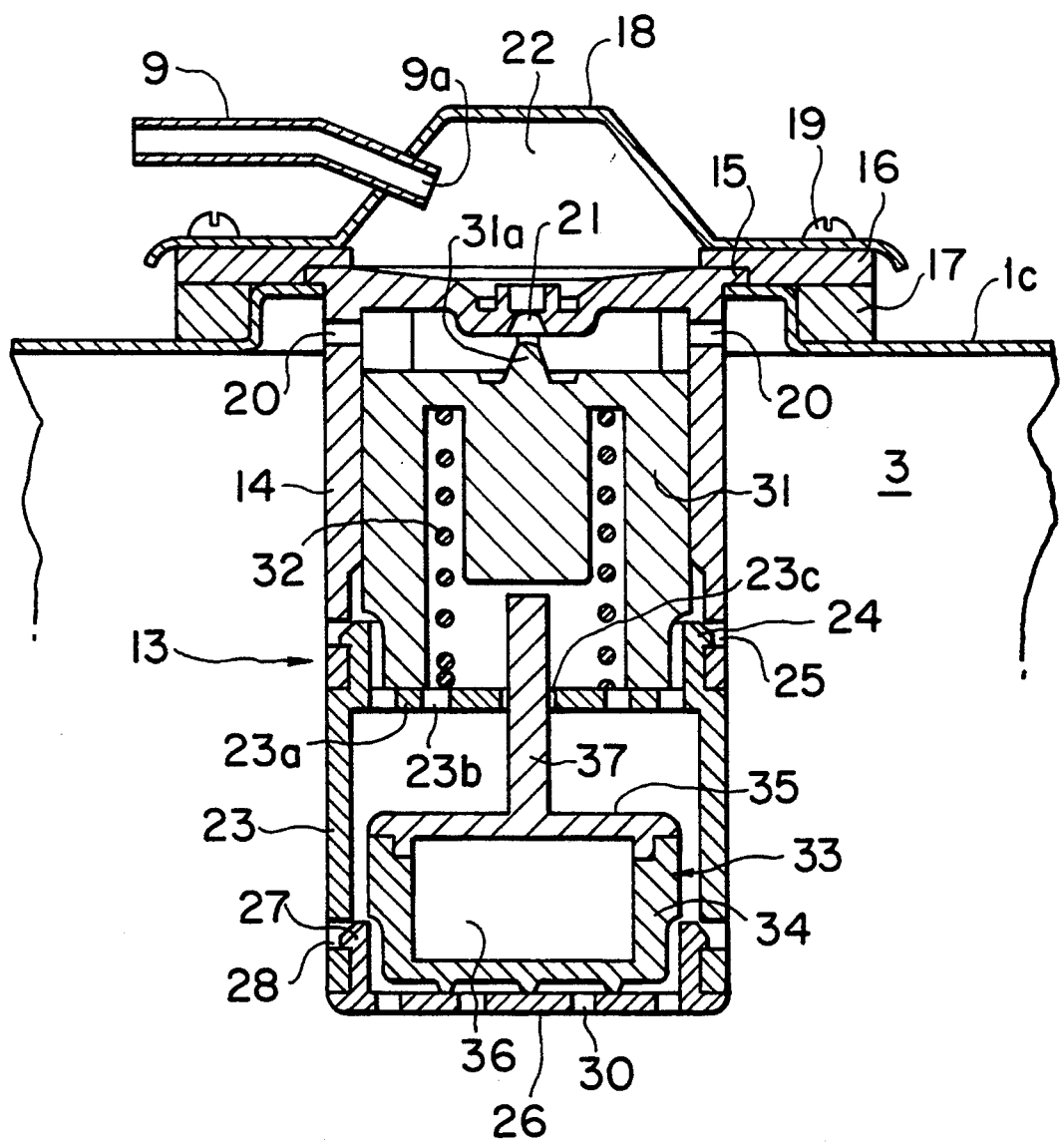
FIG. 2 is a vertically cross-sectional view showing a first embodiment of a fuel cutoff valve with a float in the fuel tank structure according to the invention.

Referring to FIG. 1, reference numeral 1 designates a fuel tank which includes a recessed portion 1a at its central region and a first air chamber 2 and a second air chamber 3 formed at both sides of the recessed portion 1a. A top wall 1c of the second air chamber 3 is formed at a level lower than a top wall 1b of the first air chamber 2.

A fuel cutoff valve 4 having a structure similar to a conventional one is provided on the top wall of the first air chamber 2, projecting in the interior of the first air chamber 2.

A fuel cutoff valve having a float 13 is provided on the top wall of the second air chamber 3, projecting in the interior of the second air chamber 3.

Numerals 11 and 12 denote a fuel tube and a breather pipe, respectively.

A structure of the fuel cutoff valve having a float 13 will be described in detail with reference to FIG. 2.

A cylindrical upper casing 14 has a collar 15 formed at its upper end outer periphery. The collar 15 is engaged with a peripheral upper surface of a fastening hole formed in the top wall 1c of the fuel tank in such a manner that the upper casing 14 projects in the interior of the second air chamber 3 of the fuel tank.

The collar 15 is pressed by a gasket 16 and securely attached to the top wall 1c of the fuel tank by means of screws 19 together with a cover 18.

Discharge holes 20 for fuel evaporation gas are provided in the upper casing 14. As shown in FIG. 2, the discharge holes 20 are formed at positions in the vicinity of the upper end of a circumferential wall of the upper casing 14, where the discharge holes 2 communicate with an upper portion of the air chamber 3.

A valve seat opening 21 is formed at the central portion of a top wall of the upper casing 14. A chamber 22 is defined by the cover 18 above the valve seat opening 21.

A passage 9 is opened in and communicated with the chamber 22 at its one end 9a. The other end of the passage 9 leads to a canister through a check valve 40.

A lower casing 23 is formed in a cylindrical shape having a diameter the same as that of the upper casing 14. Fuel inlet/outlet holes 23b are provided in a top wall 23a of the lower casing 23. Upwardly-projecting locking hooks 24 are formed at an upper end outer peripheral portion of the lower casing 23. These locking hooks 24 are elastically engaged with fastening holes 25 formed at the lower portion of the upper casing 14, so that the lower casing 23 is additionally provided at and extendedly connected to the lower portion of the upper casing 14.

A bottom cover 26 includes upwardly-protruding locking hooks 27 formed at its outer peripheral portion. The locking hooks 27 are elastically engaged with fastening holes 28 formed at the lower portion of the lower casing 23, so that the bottom cover 26 is attached to the lower casing 23.

Fuel inlet/outlet holes 30 are formed in the bottom cover 26.

A second float valve 31 is vertically movably accommodated in the upper casing. Usually, the float valve 31 falls due to its own weight so that a valve portion 31a is separated from the valve seat opening 21 to open the same. When a level of fuel reaches the second float valve 31, the second float valve 31 moves upwardly due to its buoyancy so that the valve portion 31a closes the valve seat opening 21.

A spring 32 which assists the upward movement of the second float valve 31 is interposed between the second float valve 31 and the top wall 23a of the lower casing 23.

A float 33 is vertically movably accommodated in the lower casing 23. The float 33 includes a hollow portion 36 tightly sealed therein by means of a float lower half 34 and a float upper half 35. The float 33 is arranged to rise to the surface of the wall by its buoyancy when it sinks in the fuel.

A push rod 37 is provided at the center on an upper surface of the float upper half 35 in an upwardly-projecting manner. The push rod 37 extends through a hole 23c in the top wall 23a of the lower casing 23. One end of the push rod extends opposite to and in the vicinity of the central bottom face of the second float valve 31.

Under the condition that the fuel tank is fully filled with the fuel as shown in FIG. 1, the fuel cutoff valve 4 of the first air chamber 2 is located at a position considerably higher than the level of the fuel so that a distance H from the fuel level to a discharge port 20 (a valve seat opening) of the fuel cutoff valve 4 is set to be long enough that the fuel level will not reach the valve seat opening of the fuel cutoff valve 4 even in an accident that the automobile is inclined at a certain angle.

The upper casing 14 of the fuel cutoff valve with the float 13 disposed in the second air chamber 3 has the structure similar to that of the fuel cutoff valve 4. A longitudinal length of the upper casing 14 of the fuel cutoff valve with the float 13 is the same as the casing of the fuel cutoff valve 4. The fuel cutoff valve with the float 13 has a length larger than that of the fuel cutoff valve 4 by a length of the lower casing 23 downwardly. Longitudinal lengths of the lower casing 23, the float 33 and the push rod 37 are pre-determined so that a distance H between the fuel level in the second air chamber 3 and the discharge port 20 (the valve seat opening), at the time when the float 33 rises to the surface to close the valve seat opening 21, becomes equal to the distance H in the first air chamber 4.

A function of the above-described embodiment will be described hereinafter.

In a state that an amount of fuel in the fuel tank is small and the level of the fuel is lower than that shown in FIG. 1, when the fuel is supplied through the fuel tube 11, the fuel level in the fuel tank 1 is raised.

When the fuel level arrives at the float 33 of the fuel cutoff float valve 13 in the second air chamber 3 and further rises, the float 33 also moves upwardly, while the push rod 37 lifts the second float valve 31 so that the valve portion 31a closes the valve seat opening 21. By this closure, the second air chamber 3 is tightly sealed to thereby prevent gas from flowing out of the chamber and inhibit the fuel level A in the second air chamber 3 from being further raised. As a result, the large distance H between the fuel level A and the discharge port 20 of the fuel cutoff valve with the float 13 can be maintained.

If the fuel supply is further continued, the fuel level only in the first air chamber 2 is raised. When the fuel level attains a lower end of the breather pipe 12, the first air chamber is tightly closed by the check valve 40 so as to prevent the gas from flowing out of the chamber and inhibit the fuel level in the air chamber from being further raised. Thus, the fuel tank is brought into a fully-filled condition so that the fuel supply is stopped. Consequently, the distance H between the fuel level B in such fully filled condition of the fuel tank and the discharge port (valve seat opening) of the fuel cutoff valve 4 can be maintained at a large value.

As mentioned above, not only the distance H in the first air chamber 2 but also the distance H in the second air chamber 3 can be predetermined at large values. Accordingly, in the state in which the fuel tank is fully filled with the fuel, even if the fuel level in the fuel tank is inclined or the fuel quakes when the automobile is turned or braked, the fuel is less liable to flow into the valve seat opening through the discharge holes of each of the fuel cutoff valve 4 and the fuel cutoff valve with the float 13.

It is thus possible to prevent from causing a phenomenon in which the fuel flows into the valve seat opening to spout into the passage 9.

Further, when the automobile turns over and lies on its side, the second float valve 31 of the fuel cutoff valve with the float 13 is forced up by its own weight and a pressing force of the spring 32, so that the valve seat opening 21 is closed to prevent the fuel from flowing out of the tank.

Figure 3:
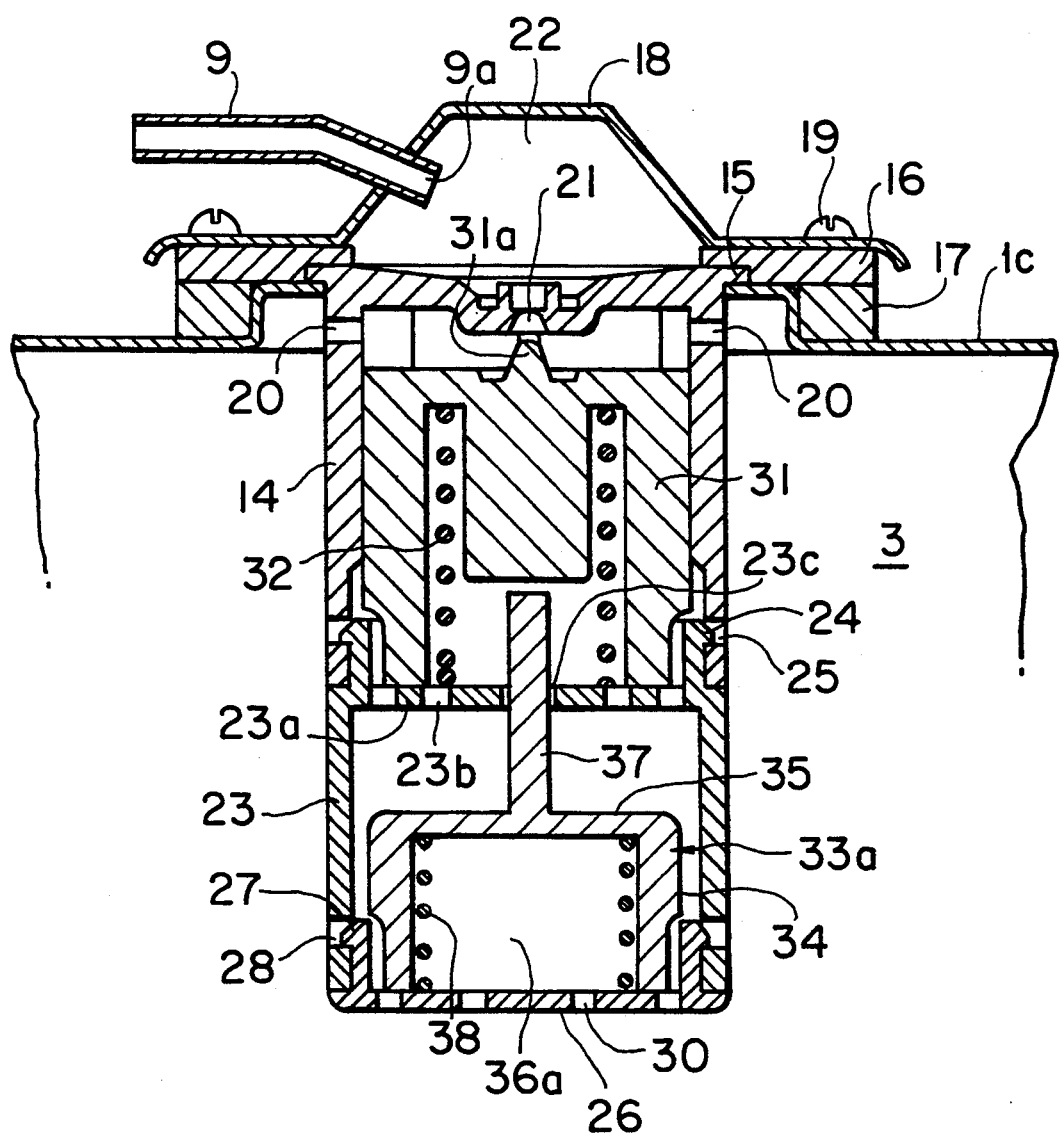
FIG. 3 is a vertically cross-sectional view showing a second embodiment of a fuel cutoff valve with a float in the fuel tank structure according to the invention.

FIG. 3 shows a second embodiment of a fuel cutoff valve having a float in the fuel tank structure according to the present invention.

In the illustrated embodiment, a float 33a is obtained by modifying the float 33 of the first embodiment. More specifically, the float 33a is formed with a bottomless hollow portion 36a therein. A spring 38 for lifting the float 33a upwardly is disposed within the hollow portion 36a.

Structures of other component parts are similar to those of the first embodiment. Accordingly, the same reference numerals are appended thereto and a description thereof will be omitted.

A function and effect similar to those of the first embodiment can also be fulfilled in the second embodiment.

Figure 4:
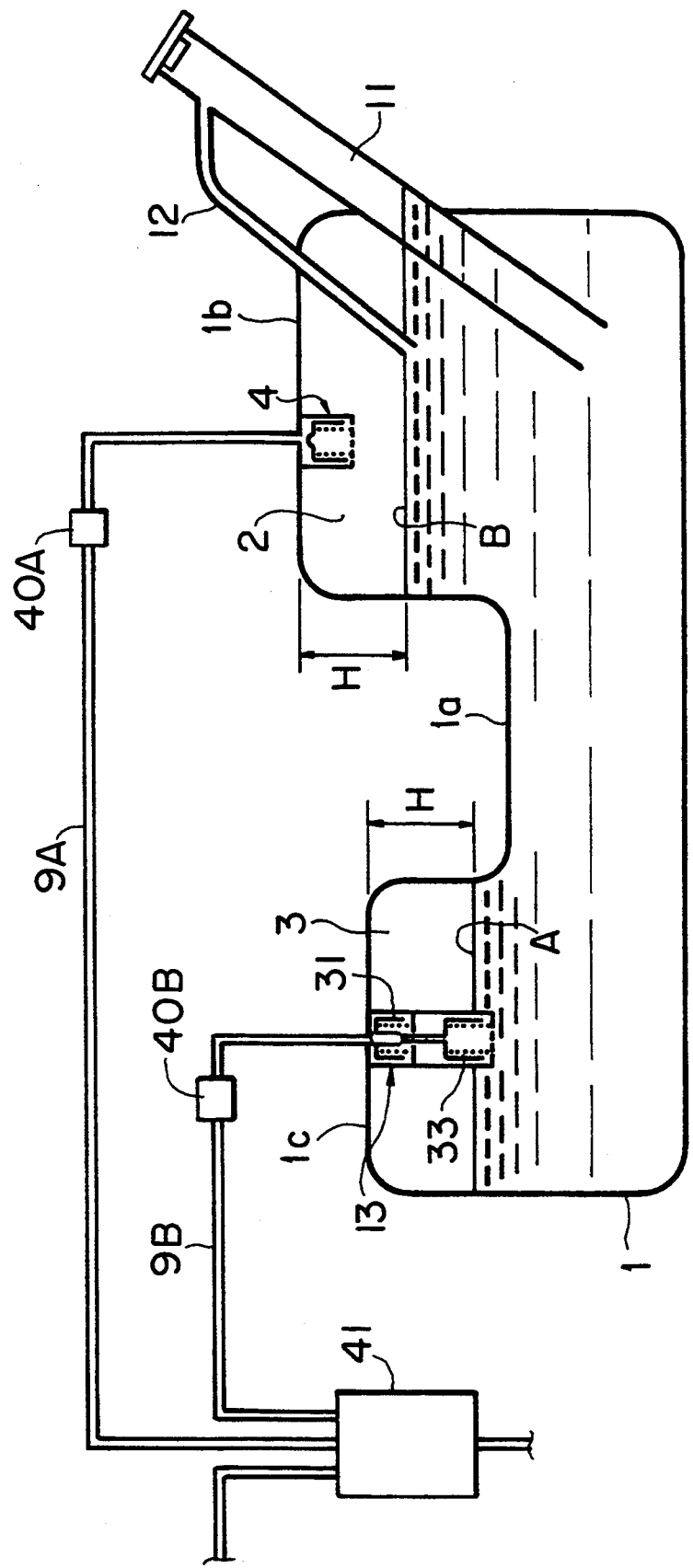
FIG. 4 is a cross-sectional view showing a modified example of the structure of the fuel tank according to the invention.
Figure 5:
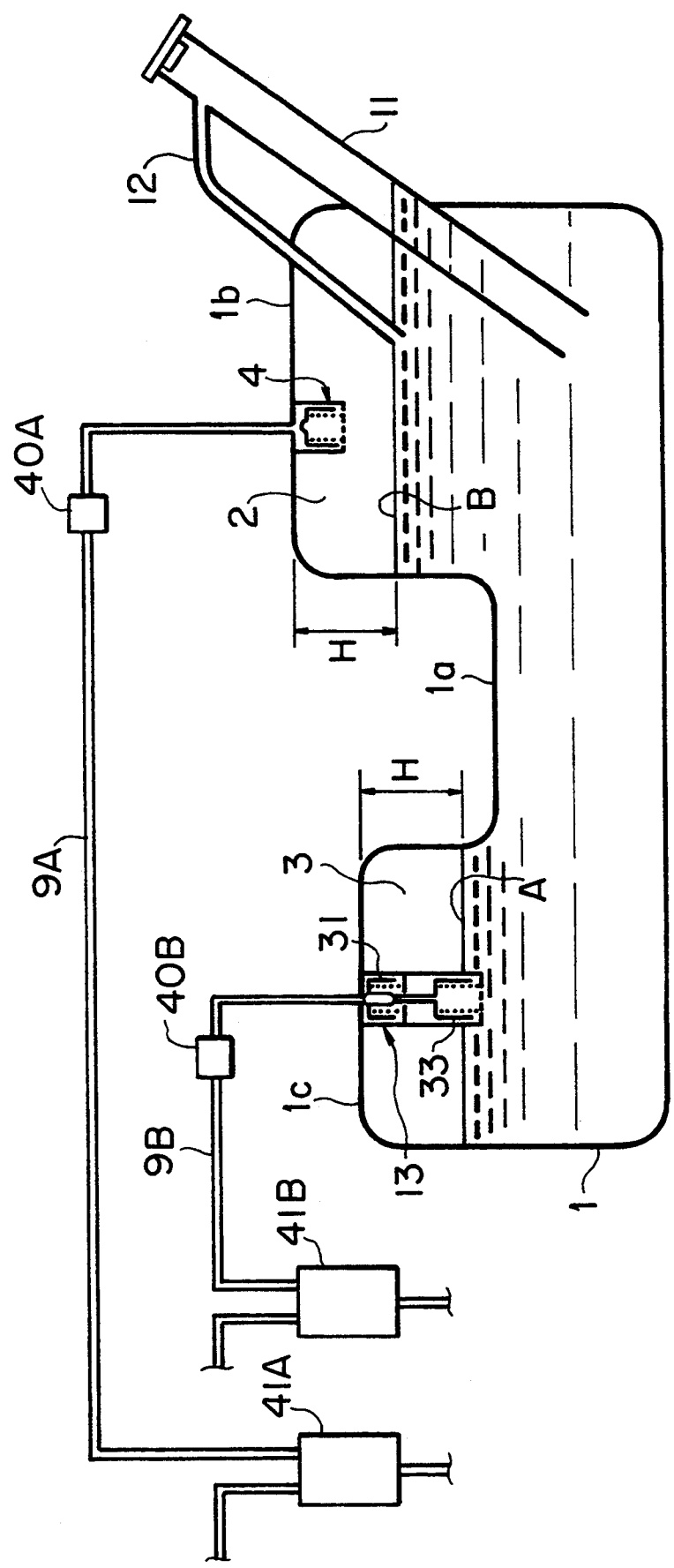
FIG. 5 is a cross-sectional view showing another modified example of the structure of the fuel tank according to the invention.
Figure 6:
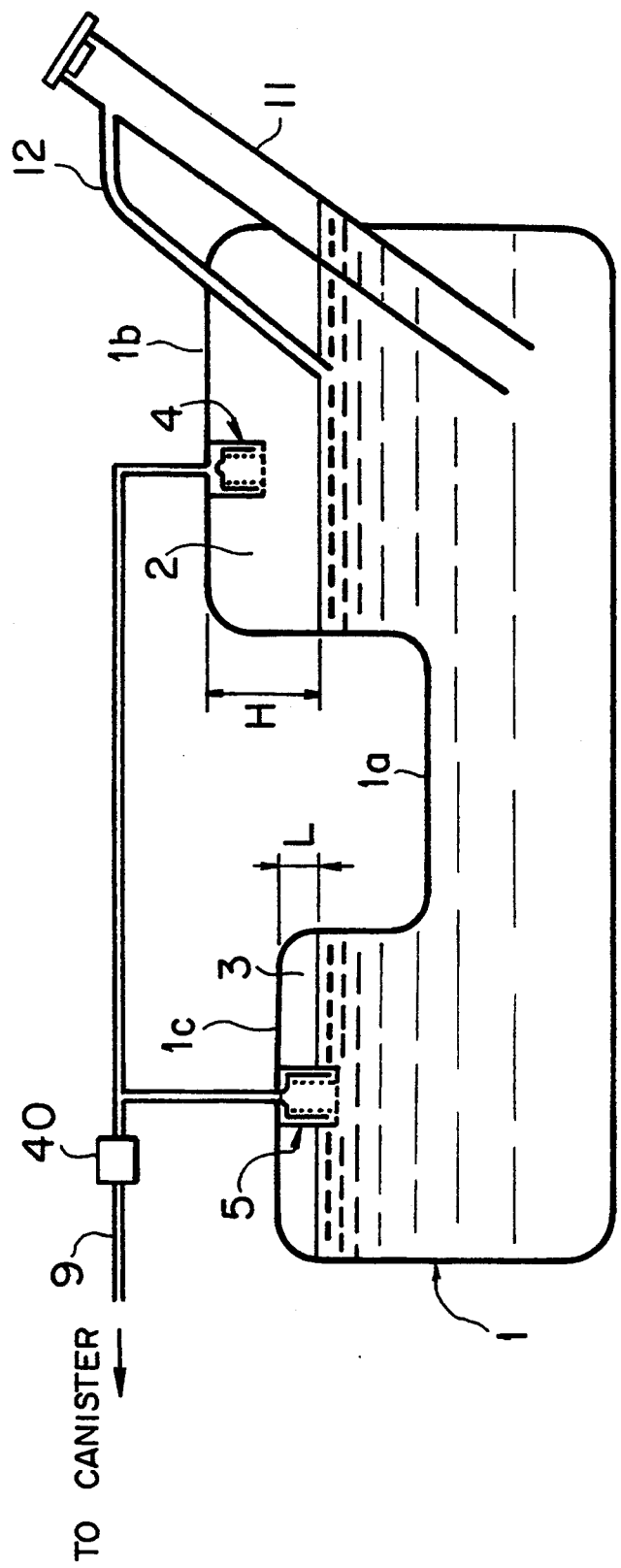
FIG. 6 is a cross-sectional view of a fuel tank provided with a conventional fuel cutoff valve.
Figure 7:
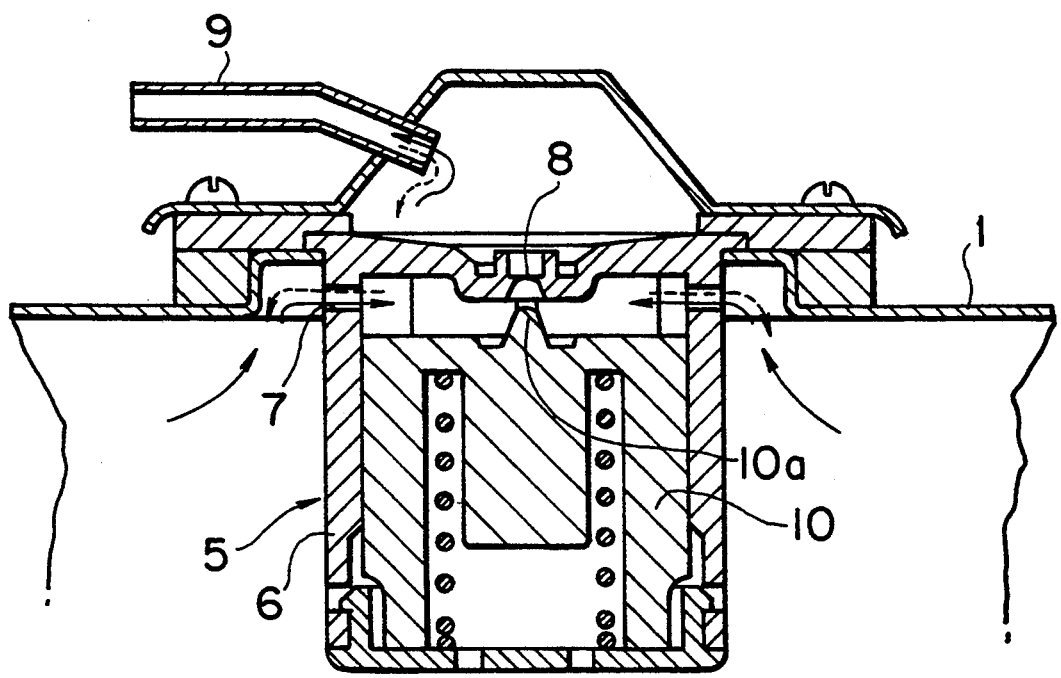
FIG. 7 is a vertically cross-sectional view showing the conventional fuel cutoff valve.

Further, as shown in FIGS. 4 and 5, check valves and canisters may separately be provided on the fuel cutoff valve and the fuel cutoff valve with the float selectively.

According to the present invention having the above-described structure, in the fuel tank including the air chambers with the high-level top wall and the low-level top wall, by providing the fuel cutoff valve with the float in the air chamber having the low-level top chamber, the fuel is less liable to spout from the air chamber including the low-level top wall even under the condition in which the fuel tank is fully filled with the fuel.

Therefore, according to the invention, deterioration of the canister caused by the fuel flowing into the canister can be prevented.

What is claimed is:

1. A structure of a fuel tank to be installed in an automobile comprising:
   a fuel tank having a top wall formed with a centrally located recessed portion thereon and a first air chamber and a second air chamber separated from each other by said recessed portion, said first and second air chambers having a high-level and a low-level top wall, respectively, located at levels in height different from each other;

a fuel tube attached to said tank and equipped with a breather pipe;

a first fuel cutoff valve provided on said high-level top wall of said first chamber, said first fuel cutoff valve having a first casing projecting in an interior of said first air chamber, discharge holes for fuel evaporation gas formed at an upper end of said first casing so as to communicate said first air chamber with an interior of said first casing, a first valve seat opening formed at a central portion on a top wall of said first casing, a first float valve vertically movably provided in said first casing in order to tightly close said first valve seat opening when said first float valve moves upwardly, and a spring for pressing said first float valve toward said first valve seat opening;

a second fuel cutoff valve with a float provided on said low-level top wall of said second air chamber, said second fuel cutoff valve having an upper casing projecting in an interior of said second air chamber, discharge holes for fuel evaporation gas formed at an upper end of said upper casing so as to communicate said second air chamber with an interior of said upper casing, a second valve seat opening formed at a central portion on a top wall of said upper casing, a second float valve vertically movably provided in said upper casing in order to tightly close said second valve seat opening when said second float valve moves upwardly, a spring for pressing said second float valve toward said second valve seat opening, a lower casing provided at a bottom of said upper casing and extending therefrom downwardly, a lower float vertically movably accommodated in said lower casing, and a push rod for lifting said second float valve; and conduit means extending from said first fuel cutoff valve and said second fuel cutoff valve through at least one check valve to at least one canister.

2. A structure of a fuel tank according to claim 1, wherein said conduit means comprises a first conduit extending from said first fuel cutoff valve and a second conduit extending from said second fuel cutoff valve which are connected to each other on an upstream side of a common check valve.

3. A structure of a fuel tank according to claim 1, wherein said conduit means comprises a first conduit having said at least one check valve and extending from said first fuel cutoff valve and a second conduit having said at least one check valve and extending from said Second fuel cutoff valve which are connected to each other on downstream sides of said check valves respectively provided on said first and second conduits so as to extend to said at least one canister.

4. A structure of a fuel tank according to claim 1, wherein said conduit means comprises a first conduit extending from said first fuel cutoff valve and a second conduit extending from said second fuel cutoff valve, said first conduit and said second conduit each including said at least one check valve and said at least one canister, respectively.

* * * * *